(12) United States Patent
Yan et al.

(10) Patent No.: US 12,065,121 B2
(45) Date of Patent: Aug. 20, 2024

(54) VEHICLE, START CONTROL METHOD FOR VEHICLE, AND START CONTROL SYSTEM OF VEHICLE

(71) Applicant: BYD COMPANY LIMITED, Shenzhen (CN)

(72) Inventors: Huijia Yan, Shenzhen (CN); Lihua Wu, Shenzhen (CN); Chengpiao Pan, Shenzhen (CN)

(73) Assignee: BYD COMPANY LIMITED, Shenzhen (CN)

(*) Notice: Subject to any disclaimer, the term of this patent is extended or adjusted under 35 U.S.C. 154(b) by 926 days.

(21) Appl. No.: 17/048,784

(22) PCT Filed: Apr. 18, 2019

(86) PCT No.: PCT/CN2019/083263
§ 371 (c)(1),
(2) Date: Oct. 19, 2020

(87) PCT Pub. No.: WO2019/201306
PCT Pub. Date: Oct. 24, 2019

(65) Prior Publication Data
US 2021/0146911 A1    May 20, 2021

(30) Foreign Application Priority Data

Apr. 20, 2018   (CN) .......................... 201810360318.9

(51) Int. Cl.
*B60W 10/00*   (2006.01)
*B60W 10/06*   (2006.01)
(Continued)

(52) U.S. Cl.
CPC ............ *B60W 20/00* (2013.01); *B60W 10/06* (2013.01); *B60W 10/08* (2013.01); *B60W 10/10* (2013.01);
(Continued)

(58) Field of Classification Search
CPC ...... B60W 20/00; B60W 10/06; B60W 10/08; B60W 10/10; B60W 10/24; B60W 50/04;
(Continued)

(56) References Cited

U.S. PATENT DOCUMENTS 5,485,376 A * 1/1996 Oike ...................... B62D 1/181
                                                           280/775
6,496,100 B1 * 12/2002 Hiebl ....................... B60R 25/24
                                                           340/426.36
(Continued)

FOREIGN PATENT DOCUMENTS

CN          1715629 A      1/2006
CN        101213577 A      7/2008
(Continued)

OTHER PUBLICATIONS

The World Intellectual Property Organization (WIPO) International Search Report for PCT/CN2019/083263 Jul. 30, 2019 6 Pages.

*Primary Examiner* — Shardul D Patel
(74) *Attorney, Agent, or Firm* — Wenye Tan (57) ABSTRACT

The present disclosure provides a vehicle, a start control method for the vehicle, and a start control system of the vehicle. The method includes: when a door of the vehicle is in an open state, determining a position of a key; when the key is in the vehicle, controlling a first high-voltage module group of the vehicle to perform power on; when the door of the vehicle is changed from the open state to a closed state, determining the position of the key and detecting a state of a brake pedal of the vehicle; and when the brake pedal of the vehicle is depressed and the key is in the vehicle, controlling, according to a start instruction, a second high-voltage module group of the vehicle to perform power on.

19 Claims, 3 Drawing Sheets (51) Int. Cl.
*B60W 10/08* (2006.01)
*B60W 10/10* (2012.01)
*B60W 10/24* (2006.01)
*B60W 20/00* (2016.01)
*B60W 50/04* (2006.01)

(52) U.S. Cl.
CPC ............ *B60W 10/24* (2013.01); *B60W 50/04* (2013.01); *B60W 2540/12* (2013.01); *B60W 2540/16* (2013.01)

(58) Field of Classification Search
CPC ......... B60W 2540/12; B60W 2540/16; B60W 10/00; B60R 25/00; B60R 16/03; B60R 16/02
USPC .......................................................... 701/22
See application file for complete search history.

(56) References Cited

U.S. PATENT DOCUMENTS

| | | | |
|---|---|---|---|
| 6,727,800 B1* | 4/2004 | Dutu | B60R 25/257 340/426.11 |
| 2006/0232131 A1* | 10/2006 | Endo | B60R 25/043 307/10.2 |
| 2011/0068895 A1* | 3/2011 | Gee | E05B 77/48 340/5.67 |
| 2011/0231034 A1 | 9/2011 | Buford et al. | |
| 2013/0193920 A1 | 8/2013 | Aric et al. | |
| 2015/0140995 A1* | 5/2015 | Kamiya | H04L 67/12 455/420 |
| 2015/0163306 A1* | 6/2015 | Nakagawa | B60R 25/24 709/225 |
| 2018/0068510 A1 | 3/2018 | Atsumi | |
| 2020/0298797 A1* | 9/2020 | Shin | B60R 25/045 |

FOREIGN PATENT DOCUMENTS

| | | |
|---|---|---|
| CN | 101318489 A | 12/2008 |
| CN | 101801739 A | 8/2010 |
| CN | 102019905 A | 4/2011 |
| CN | 102834287 A | 12/2012 |
| CN | 102862549 A | 1/2013 |
| CN | 104943555 A | 9/2015 |
| CN | 105960347 A | 9/2016 |
| CN | 106218552 A | 12/2016 |
| CN | 107521456 A | 12/2017 |
| EP | 2058197 A1 | 5/2009 |
| JP | 2004197649 A | 7/2004 |
| JP | 4890993 B2 | 3/2012 |
| KR | 100520451 B1 | 10/2005 |
| KR | 20130043535 A | 4/2013 |
| WO | 2013186615 A1 | 12/2013 |
| WO | 2015000872 A1 | 1/2015 |

\* cited by examiner

VEHICLE, START CONTROL METHOD FOR VEHICLE, AND START CONTROL SYSTEM OF VEHICLE

CROSS-REFERENCE TO RELATED APPLICATIONS

This application is a national phase entry under 35 U.S.C. § 371 of International Application No. PCT/CN2019/083263, filed on Apr. 18, 2019, which is based on and claims priority to Chinese Patent Application No. 201810360318.9 filed on Apr. 20, 2018, the entire content of all of which is incorporated herein by reference in its entirety.

FIELD

This application relates to the field of vehicle technology, and in particular, to a start control method for a vehicle, a start control system of a vehicle, and a vehicle.

BACKGROUND

For a vehicle in the related art, an entire start process is usually started after the user enters the vehicle, depresses a brake pedal, and presses a start button. However, according to the present disclosure, it is found that, in the related art, pre-charging time of some high-voltage modules is long, and a time for the user to wait for the vehicle to start is long after the start button is pressed, so that user experience is affected.

SUMMARY

The present disclosure is intended to resolve at least resolve one of technical problems in foregoing technology to some extent. Accordingly, a first objective of the present disclosure is to provide a start control method for a vehicle to effectively reduce a time for a user to wait for a vehicle to start.

A second objective of the present disclosure is to provide a start control system of a vehicle.

A third objective of the present disclosure is to provide a vehicle.

In order to achieve the foregoing objective, in a first aspect, an embodiment of the present disclosure provides a start control method for a vehicle, including the following steps: when a door of the vehicle is in an open state, determining a position of a key; controlling, if the key is in the vehicle, a first high-voltage module group of the vehicle to perform power on; and when the door of the vehicle is changed from the open state to a closed state, determining the position of the key and detecting a state of a brake pedal of the vehicle; and if the brake pedal of the vehicle is depressed and the key is in the vehicle, controlling, according to a start instruction, a second high-voltage module group of the vehicle to perform power on.

In the start control method for a vehicle according to the embodiment of the present disclosure, when the door of the vehicle is in the open state and the key is in the vehicle, the first high-voltage module group of the vehicle is controlled to perform power on, the door is changed from the open state to the closed state, and the brake pedal of the vehicle is depressed and the key is in the vehicle, a second high-voltage module group of the vehicle is controlled, according to a start instruction, to perform power on, so that the first high-voltage module group is controlled in advance, by using a time for a user to open and close the door, to perform power on, reducing a time for the user to start the vehicle after a start instruction is input, effectively shortening a time for the user to wait for the vehicle to start, and improving user experience.

In order to achieve the foregoing objective, in a second aspect, an embodiment of the present disclosure provides a start control system of a vehicle, including: a first high-voltage module group and a second high-voltage module group; a key controller configured to detect whether a key is in the vehicle; and a body control module configured to: when a door of the vehicle is in an open state, determine a position of the key through the key controller; when determining that the key is in the vehicle, control the first high-voltage module group to be power on; when the door of the vehicle is changed from the open state to a closed state, determine the position of the key through the key controller and detect a state of a brake pedal of the vehicle; and when the brake pedal of the vehicle is depressed and the key is in the vehicle, control, according to a start instruction, the second high-voltage module group to perform power on.

In the start control system of a vehicle according to the embodiment of the present disclosure, when the door of the vehicle is in the open state and the key is in the vehicle, the body control module controls the first high-voltage module group of the vehicle to perform power on, and when the door is changed from the open state to the closed state, and the brake pedal of the vehicle is depressed and the key is in the vehicle, the body control module controls, according to a start instruction, a second high-voltage module group of the vehicle, to perform power on, so that the first high-voltage module group is controlled in advance, by using a time for a user to open and close the door, to perform power on, reducing a time for the user to start the vehicle after inputting a start instruction, effectively shortening a time for the user to wait for the vehicle to start, and improving user experience.

In order to achieve the foregoing objective, in a third aspect, an embodiment of the present disclosure provides a vehicle including the start control system of the vehicle.

For the vehicle according to the embodiment of the present disclosure, by using the start control system of the foregoing embodiment, the first high-voltage module group is controlled in advance, by making full use of a time for the user to open and close the door, to perform power on, reducing the time for the user to start the vehicle after inputting a start instruction, effectively shortening a time for the user to wait for the vehicle to start, and improving user experience.

Other aspects and advantages of the present disclosure will be given in the following description, some of which will become apparent from the following description or may be learned from practices of the present disclosure.

DETAILED DESCRIPTION

The following describes embodiments of the present disclosure in detail. Examples of the embodiments are shown in the accompanying drawings, and same or similar reference signs in all the accompanying drawings indicate same or similar components or components having same or similar functions. The embodiments described below with reference to the accompanying drawings are exemplary, and are intended to explain the present disclosure and cannot be construed as a limitation to the present disclosure.

A vehicle, a start control method for the vehicle, and a start control system of the vehicle are described below according to embodiments of the present disclosure with reference to the drawings.

Figure 1:
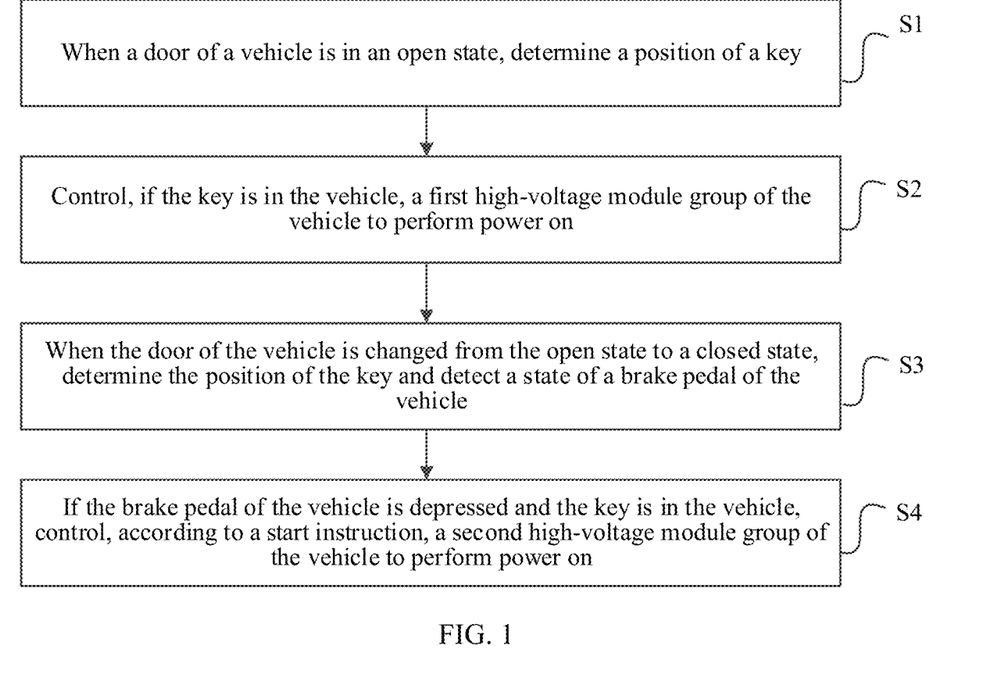
FIG. 1 is a flowchart of a start control method for a vehicle according to an embodiment of the present disclosure.

FIG. 1 is a flowchart of a start control method for a vehicle according to an embodiment of the present disclosure. As shown in FIG. 1, the start control method for the vehicle includes the following steps.

S1: When a door of the vehicle is in an open state, determine a position of a key.

A door state signal may be collected through a body control module (BCM), and it is determined, according to the door state signal, whether the door is in the open state. When a driver unlocks the door with the key, the vehicle is in an OFF gear in a non-anti-theft state, that is, the vehicle is in a power-off state. At this time, if the door is open, for example, a door (which may be a left front door) corresponding to a driving position is open, the body control module (BCM) may collect the door state signal, and determines, according to the door state signal, that the door is open, that is, in the open state.

According to an embodiment of the present disclosure, it may be determined, according to strength of a signal sent by the key, whether the key is in the vehicle. After detecting that the door is open, the body control module (BCM) may send a request for searching for the key to the key controller (IK). The key controller (IK) starts to detect the strength of the signal sent by the key, and determines, according to the strength of the signal, whether the key is in the vehicle. For example, the key may transmit a preset signal in real time or at a preset time interval. The key controller (IK) may detect the preset signal after receiving the request for searching for the key, and obtain strength of the detected preset signal. If the strength is greater than preset strength, it is determined that the key is in the vehicle.

After detecting that the key is in the vehicle, the key controller (IK) may send information that the key is in the vehicle to the body control module (BCM), and the body control module may determine that the key is in the vehicle.

S2: Control, if the key is in the vehicle, a first high-voltage module group of the vehicle to perform power on.

According to an embodiment of the present disclosure, the first high-voltage module group includes at least one of a vehicle control unit, a battery management system, and a motor controller.

According to an embodiment of the present disclosure, the first high-voltage module group may include the vehicle control unit, the battery management system, and the motor controller. The controlling a first high-voltage module group of the vehicle to perform power on includes:
  controlling the vehicle control unit, the battery management system, and the motor controller to perform power-on self-check, respectively; and
  after the power-on self-check is completed, controlling, by the vehicle control unit, the battery management system to perform pre-charging, and the battery management system pulling in the main contactor upon completion of pre-charging.

It may be understood that the power-on self-check is a routine procedure for self-check after the power on is performed. In other words, each of the vehicle control unit, the battery management system, and the motor controller may perform power-on self-check according to a preset self-check program to detect whether there is a power on failure.

The body control module (BCM) may connect the vehicle control unit (VCU), the battery management system (BMS), and the motor controller to a power supply circuit after detecting that the door is open and it is determined that the key is in the vehicle. The vehicle control unit (VCU), the battery management system (BMS), and the motor controller may be connected to the power supply circuit by controlling closing of a control relay. The vehicle control unit (VCU), the battery management system (BMS), and the motor controller perform power on self-inspection respectively after being connected to the power supply circuit. After the self-check is completed, the vehicle control unit (VCU) sends pre-charge permission information to the battery management system (BMS), the battery management system (BMS) starts pre-charging and pulls in a main contactor upon completion of the pre-charging. The battery management system (BMS) may control pull-in of the main contactor, so that the vehicle control system (VCU), the battery management system (BMS), and the motor controller enter a pre-charging state, and pulls in the main contactor upon completion of the pre-charging, so that the vehicle control unit (VCU), the battery management system (BMS), and the motor controller supply power normally.

Accordingly, a time from opening to closing of the door is fully used to control high-voltage modules with a long pre-charging time including the vehicle control unit, the battery management system, and the motor controller to enter the pre-charging state in advance.

S3: When the door of the vehicle is changed from an open state to a closed state, determine the position of the key and detecting a state of a brake pedal of the vehicle.

The door state signal may be collected through the body control module (BCM), and it is determined, according to the door state signal, whether the door is in a closed state. After the driver closes the door, such as a door (which may be the left front door) corresponding to the driving position, the body control module (BCM) may collect the door state signal and determine, according to the door state signal, that the door is closed.

According to an embodiment of the present disclosure, after the door of the vehicle is in the closed state, the method further includes:
  supplying power to a steering shaft lock of the vehicle;
  controlling the steering shaft lock to perform code matching verification with the key controller of the vehicle; and
  after the code matching verification is performed successfully, controlling the steering shaft lock to be unlocked.

It should be noted that a steering shaft transmits a steering torque applied to a steering wheel by a driver to a steering gear. When the steering shaft is locked, rotational movement of the steering shaft is restricted, and the steering torque of the steering wheel cannot be transmitted to the steering gear, so that the vehicle cannot be driven. When the steering shaft is unlocked, the steering shaft may rotate, the steering torque of the steering wheel may be transmitted to the steering gear, so that the vehicle may be driven.

In other words, after the driver closes the door, the body control module (BCM) may collect a door signal and determine that the door is in a closed state. At this time, the body control module (BCM) supplies power to the steering shaft lock (ECL) and sends an unlocking instruction to the steering shaft lock. The steering shaft lock (ECL) may perform code matching verification with the key controller according to the unlocking instruction. The steering shaft lock (ECL) may send code matching verification information to the key controller (IK). The code matching verification information may include a verification password, or may include a vehicle identification code and a verification password, and the key controller (IK) may determine the code matching verification information, for example, determining whether the code matching verification information sent by the steering shaft lock (ECL) is consistent with code matching verification information pre-stored in the key controller (IK) itself. If yes, it is determined that the code matching succeeds. Furthermore, the key controller (IK) may obtain an unlocking permission signal as a feedback to the steering shaft lock (ECL) after the code matching succeeds, and the steering shaft lock (ECL) may be unlocked according to the unlocking permission signal. After the steering shaft lock is successfully unlocked, the steering shaft may rotate. If the code matching fails, the steering shaft lock (ECL) remains in a locked state.

Accordingly, an illegal key may be effectively prevented from starting the vehicle to ensure that the vehicle may be started by using a key paired with the vehicle.

S4: If the brake pedal of the vehicle is depressed and the key is in the vehicle, control, according to a start instruction, a second high-voltage module group of the vehicle to perform power on.

A brake pedal sensor may be disposed at the brake pedal, and a signal of the brake pedal sensor may be collected through the body control module (BCM) to determine a state of the brake pedal. When the driver enters the vehicle and depresses the brake pedal, the body control module (BCM) may determine, by collecting a signal from the pedal sensor, that the brake pedal is depressed by collecting signal from the pedal sensor.

When detecting that the brake pedal is depressed, the body control module (BCM) further sends a request for searching for the key to the key controller (IK), and the key controller (IK) determines, according to strength of the signal sent by the key, whether the key is in the vehicle. After detecting that the key is in the vehicle, the key controller (IK) may send information that the key is in the vehicle to the body control module (BCM), and the body control module may determine that the key is in the vehicle.

When the door is in a closed state, the brake pedal is depressed and the key is in the vehicle, it is detected, through the body control module (BCM), whether a start button is pressed. If the start button is pressed, it is determined that a start instruction is received, and the body control module (BCM) may control a second high-voltage module group to perform power on.

According to an embodiment of the present disclosure, the controlling, according to the start instruction, a second high-voltage module group of the vehicle to perform power on includes:
  after receiving the start instruction, supplying power to the steering shaft lock of the vehicle and determining a state of the steering shaft lock;
  if the steering shaft lock is in a locked state, controlling the steering shaft lock to perform code matching verification with the key controller of the vehicle;
  after the code matching verification is performed successfully, controlling the steering shaft lock to be unlocked; and
  after the steering shaft lock is unlocked, controlling the second high-voltage module group of the vehicle to perform power on.

In other words, after it is determined that the start instruction is received and before the second high-voltage module group is controlled to perform power on, the body control module (BCM) may supply power to the steering shaft lock (ECL) and send an unlocking state determining signal to the steering shaft lock (ECL). If the steering shaft lock (ECL) is in an unlocked state, an unlocking state signal is sent to the body control module (BCM). If the steering shaft lock (ECL) is in a locked state, the steering shaft lock (ECL) may send code matching verification information to the key controller (IK). The code matching verification information may include a verification password, or may include a vehicle identification code and a verification password, and the key controller (IK) may determine the code matching verification information, for example, determining whether the code matching verification information sent by the steering shaft lock (ECL) is consistent with code matching verification information pre-stored in the key controller (IK) itself. If yes, it is determined that the code matching succeeds. Furthermore, the key controller (IK) may obtain an unlocking permission signal as a feedback to the steering shaft lock (ECL) after the code matching succeeds, and the steering shaft lock (ECL) may be unlocked according to the unlocking permission signal. After the steering shaft lock is unlocked successfully, the steering shaft lock (ECL) may send an unlocking state signal to the body control module (BCM).

Accordingly, an illegal key may be effectively prevented from starting the vehicle to ensure that the vehicle may be started by using a key paired with the vehicle.

According to an embodiment of the present disclosure, the second high-voltage module group may include a transmission control unit and an engine control module, and the controlling a second high-voltage module group to perform power on includes:
  controlling the transmission control unit and the engine control module to perform power-on self-check.

After the body control module (BCM) detects that the door is closed and determines that the key is in the vehicle, it is determined whether a start instruction is received. If the start instruction is received and the steering shaft lock (ECL) is in the unlocked state, high-voltage modules such as an transmission control unit (TCU) and an engine control module (ECM) may be connected to the power supply circuit, and high-voltage modules such as the transmission control unit (TCU) and the engine control module (ECM) may be closed by closing the relay, and the high-voltage modules such as the transmission control unit (TCU) and the engine control module (ECM) perform power-on self-check after being connected to the power supply circuit.

Accordingly, after the user inputs the start instruction, remaining high-voltage modules are controlled to perform power on, effectively reducing a time for the user to start the vehicle after entering the start instruction. For example, the time may be shortened to 0.95 s (3.46 s in related technologies), effectively shortening a time for the user to wait for the vehicle to start, and greatly improving user experience of start by the user.

It should be noted that the high-voltage module in the embodiment of the present disclosure is opposite to a low-voltage module. For example, a module whose required power supply voltage is equivalent to a voltage of a power battery may be regarded as the high-voltage module, and a module whose required power supply voltage is equivalent to a voltage of a battery may be regarded as the low-voltage module. The voltage of the power battery is greater than the voltage of the battery, the voltage of the power battery may reach about 400V, and the voltage of the battery may be kept at 12V or 24V.

According to an embodiment of the present disclosure, after the second high-voltage module group is controlled to perform power on, the method further includes:
  determining a gear position of the vehicle; and
  when the vehicle is in a P gear or an N gear, controlling the vehicle to enter a start permission state.

In other words, after the high-voltage modules such as the transmission control unit (TCU) and the engine control module (ECM) complete power-on self-check, the transmission control unit (TCU) may send a gear position signal to the body control module (BCM), and the body control module (BCM) determines, according to the gear position signal, that the vehicle is in the P gear (parking gear) or the N gear (neutral gear), and then control the vehicle to enter a start permission state.

According to a specific embodiment of the present disclosure, the controlling the vehicle to enter a start permission state includes:
  sending, by the vehicle control unit, first verification information to the key controller;
  performing, by the key controller, verification according to the first verification information, and sending second verification information to the vehicle control unit and the motor controller after the verification succeeds;
  performing, by the vehicle control unit and the motor controller, verification according to the second verification information; and
  after both the vehicle control unit and the motor controller perform verification successfully, controlling the vehicle to enter the start permission state.

For example, when the vehicle is a pure electric vehicle, and when the body control module (BCM) determines that the vehicle is in a P (parking gear) or an N (neutral gear) according to the gear position signal, the body control module may send a start request to the vehicle control unit (VCU). The vehicle control unit (VCU) sends first verification information to a key controller (IK) after receiving the start request. The first verification information may include a first random number and a first encrypted number. The key controller (IK) performs verification according to the first verification information. After determining that the verification succeeds, the key controller (IK) sends verification success information to the vehicle control unit (VCU) and sends second verification information to the vehicle control unit (VCU) and the motor controller. The second verification information may include a second random number and a second encrypted number. After determining that the verification fails, the key controller (IK) may send verification failure information to the vehicle control unit (VCU) and not send the second verification information.

The vehicle control unit (VCU) performs verification according to the second verification information, and sends verification success information to the key controller (IK) after the verification succeeds, and the motor controller performs verification according to the second verification information, and sends verification success information to the key controller (IK) after the verification succeeds. In some embodiments, the motor controller may further send verification success information to the vehicle control unit (VCU) after it is determined that the verification succeeds.

After both the vehicle control unit (VCU) and the motor controller perform verification successfully, the vehicle control unit (VCU) sends a start permission signal to the body control module (BCM) and the battery manage system (BMS). The battery management system (BMS) feeds back a discharge permission signal to the vehicle control unit (VCU), so that the vehicle control unit (VCU) works, and the body control module (BCM) allows the vehicle to enter an OK gear, and the start is over. After the vehicle enters the OK gear, the vehicle is powered on, preparation for the start is completed, and the vehicle may be driven according to a user instruction.

It should be noted that after waiting for a preset time such as 5 s (calculated from a moment when the body control module (BCM) sends a start request to the vehicle control unit (VCU)), if a start permission signal is not received, the body control module (BCM) determines that the start fails and returns to an ON gear. After waiting for a preset time such as 5 s (calculated from a moment when the body control module (BCM) sends a start request to the vehicle control unit (VCU)), if the battery management system (BMS) does not receive a start permission signal, the battery management system controls the power battery to prohibit discharge.

It may be understood that the key controller (IK) performing verification according to the first verification information may include: the key controller (IK) decrypts a first encrypted number according to received first random number to obtain a corresponding account and password, and then authenticates the decrypted account and password to determine legitimacy and accuracy of the account and password. For example, at least one account and a password corresponding to each account may be pre-stored in the key controller (IK). When the decrypted account is consistent with the account pre-stored in the key controller (IK) and the decrypted password is consistent with a password corresponding to the account in the key controller (IK), legitimacy of the account and the password is determined, and the key controller (IK) determines that the verification succeeds. Similarly, a method for performing verification by the vehicle control unit (VCU)/motor controller according to the second verification information is basically the same as the previous method for performing, by a key controller (IK), verification according to the first verification information, and is not described in detail herein any more. According to another specific embodiment of the present disclosure, the controlling the vehicle to enter a start permission state includes:
  sending, by the vehicle control unit, first verification information to the key controller;
  performing, by the key controller, verification according to the first verification information, and sending second verification information to the vehicle control unit and the motor controller after the verification succeeds;
  performing, by the vehicle control unit and the motor controller, verification according to the second verification information; and
  after both the vehicle control unit and the motor controller perform verification successfully, sending, by the vehicle control unit, third verification information to the engine control module, and sending, by the motor controller, fourth verification information to the engine control module; and
  performing, by the engine control module, verification according to the third verification information and the fourth verification information, respectively, and controlling the vehicle to enter a start permission state after the verification succeeds.

For example, when the vehicle is a hybrid electric vehicle, and when determining that the vehicle is in a P (parking gear) or an N (neutral gear) according to the gear position signal, the body control module (BCM) may send a start request to the vehicle control unit (VCU). The vehicle control unit (VCU) sends first verification information to a key controller (IK) after receiving the start request. The first verification information may include a first random number and a first encrypted number. The key controller (IK) performs verification according to the first verification information. After determining that the verification succeeds, the key controller (IK) sends verification success information to the vehicle control unit (VCU) and sends second verification information to the vehicle control unit (VCU) and the motor controller. The second verification information may include a second random number and a second encrypted number. After determining that the verification fails, the key controller (IK) may send verification failure information to the vehicle control unit (VCU) and not send the second verification information.

The vehicle control unit (VCU) performs verification according to the second verification information, and sends verification success information to the key controller (IK) after the verification succeeds, and the motor controller performs verification according to the second verification information, and sends verification success information to the key controller (IK) after the verification succeeds. In some embodiments, the motor controller may further send verification success information to the vehicle control unit (VCU) after it is determined that the verification succeeds.

After the vehicle control unit (VCU) and the motor controller perform verification successfully, the vehicle control unit (VCU) sends third verification information to the engine control module (ECM), and the motor controller sends fourth verification information to the engine control module (ECM). The third verification information includes a third random number and a third encrypted number. The fourth verification information includes a fourth random number and a fourth encrypted number. The engine control module (ECM) performs verification according to the third verification information and performs verification according to the fourth verification information. After performing verification successfully according to the third verification information and the fourth verification information, the engine control module (ECM) sends verification success information to the vehicle control unit (VCU) and the motor controller, respectively. After receiving the verification success information, the vehicle control unit (VCU) sends a start permission signal to the body control module (BCM) and the battery manage system (BMS). The battery management system (BMS) feeds back a discharge permission signal to the vehicle control unit (VCU), so that the vehicle control unit (VCU) works, and the body control module (BCM) allows the vehicle to enter an OK gear, and the start is over. After the vehicle enters the OK gear, the vehicle is powered on, preparation for the start is completed, and the vehicle may be driven according to a user instruction.

It should be noted that after waiting for a preset time such as 5 s (calculated from a moment when the body control module (BCM) sends a start request to the vehicle control unit (VCU)), if a start permission signal is not received, the body control module (BCM) determines that the start fails and returns to an ON gear. After waiting for a preset time such as 5 s (calculated from a moment when the body control module (BCM) sends a start request to the vehicle control unit (VCU)), if the battery management system (BMS) does not receive a start permission signal, the battery management system controls the power battery to prohibit discharge.

It may be understood that the key controller (IK) performing verification according to the first verification information may include: the key controller (IK) decrypts the first encrypted number according to the received first random number to obtain a corresponding account and password, and then authenticates the decrypted account and password to determine legitimacy and accuracy of the account and password. For example, at least one account and a password corresponding to each account are pre-stored in the key controller (IK). When the decrypted account is consistent with the account pre-stored in the key controller (IK) and the decrypted password is consistent with a password corresponding to the account in the key controller (IK), legitimacy of the account and password is determined, and the key controller (IK) determines that the verification succeeds. Similarly, a method for performing verification according to the second verification information, the third verification information, and the fourth verification information is basically the same as the previous method for performing verification according to the first verification information, and is not described in detail herein any more.

It should be noted that the first random number, the second random number, the third random number, and the fourth random number may be randomly generated data, and the first encrypted number, the second encrypted number, the third encrypted number, and the fourth encrypted number may be data encrypted through a corresponding random number according to a preset encryption rule.

Accordingly, in the start control method for a vehicle according to an embodiment of the present disclosure, when a user opens a door, the body control module (BCM) collects a door state signal to determine that the door is open, and detects whether a key is in the vehicle. When the key is detected in the vehicle, the VCU, the BMS, and the motor controller performs power-on self-check, and the BMS performs pre-charging. When the user closes the door, the BCM supplies power to the ECL and sends an unlocking signal to the ECL, and the ECL performs unlocking according to the unlocking signal. After the user depresses a brake pedal and presses a start button, the user determines a state of the ECL. When the ECL is unlocked, the TCU and ECM perform power-on self-check. Therefore, a first high-voltage module group is controlled in advance, by making full use of a time for the user to open and close the door, to perform power on, and a preparation before start is made, reducing the time for the user to start the vehicle after inputting a start instruction, effectively shortening a time for the user to wait for the vehicle to start, and speeding up start of the vehicle by the user, and improving user experience.

As described above, the start control method for a vehicle according to an embodiment of the present disclosure may be roughly divided into a phase for the user to open the door, a phase for the user to close the door, and a start phase. A control flow of the phase for the user to open the door, the phase for the user to close the door, and the start phase is described in detail below with reference to FIG. 2.

Figure 2:
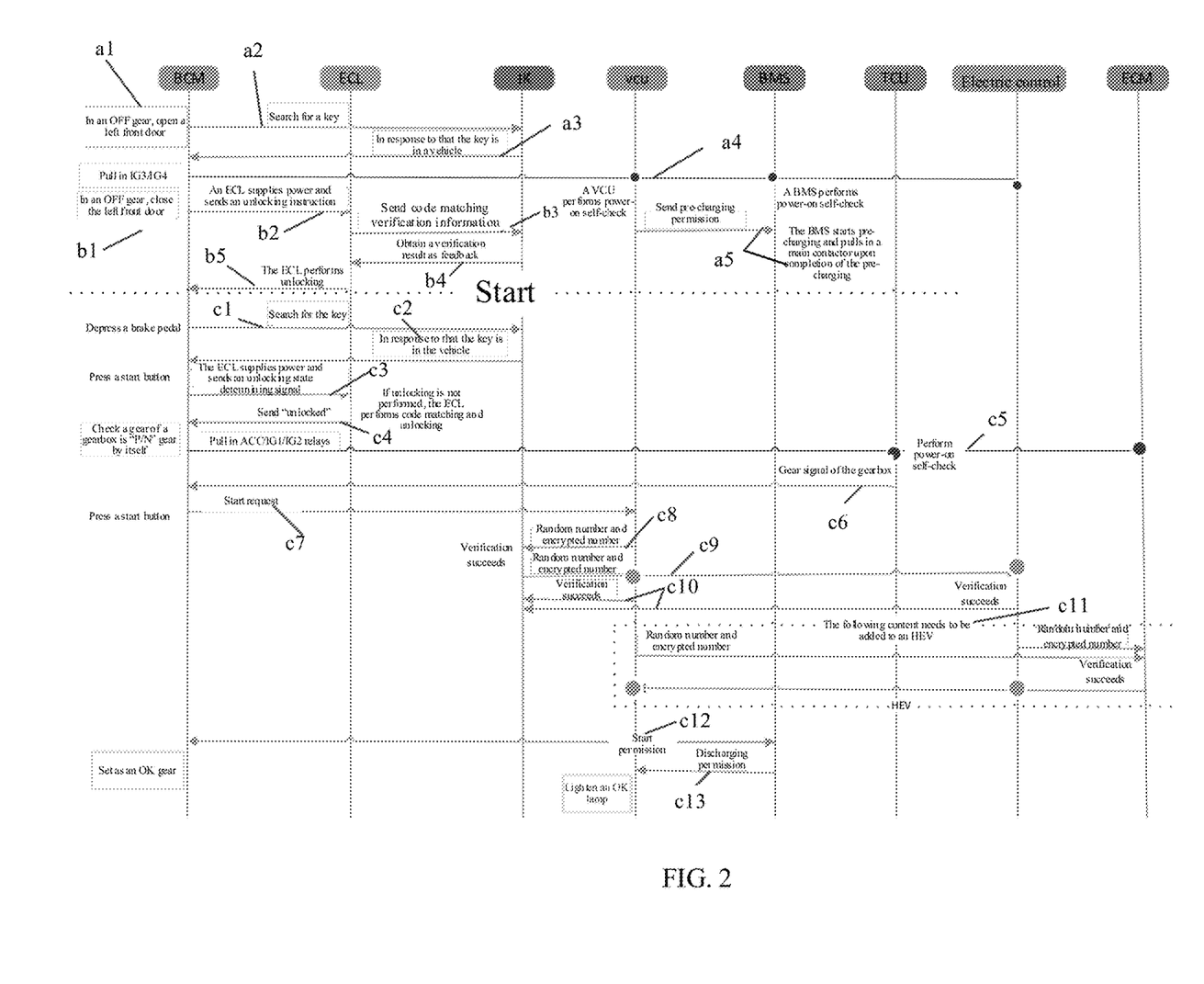
FIG. 2 is a flowchart of the start control method for a vehicle according to an embodiment of the present disclosure.

(1) The phase for the user to open the door:
Step a1: The user unlocks a vehicle, the vehicle is in an OFF gear in a non-anti-theft state, and a left front door is opened.
Step a2: A body control module (BCM) collects a door state signal and sends a request for searching for a key to a key controller (IK).

Step a3: After detecting that the key is in the vehicle, the key controller (IK) feeds back, to the body control module (BCM), information that the key is in the vehicle.

Step a4: The body control module (BCM) determines that the key is in the vehicle, and pulls in IG3 and IG4 relays to connect the vehicle control unit (VCU), the battery management system (BMS), and the motor controller to a power supply circuit, and the vehicle control unit (VCU), the battery management system (BMS), and the motor controller performs power-on self-check.

Step a5: After the self-check is completed, the vehicle control unit (VCU) sends pre-charging permission information to the battery management system (BMS), and the battery management system (BMS) starts pre-charging and pulls in a main contactor upon completion of the pre-charging.

(2) The phase for the user closes the door:

Step b1: After the user closes the left front door, the body control module (BCM) collects a door signal and determines that the door is in a closed state and the vehicle is in an OFF gear in the non-anti-theft state at this time.

Step b2: The body control module (BCM) supplies power to a steering shaft lock (ECL) and sends an unlocking instruction to the steering shaft lock (ECL).

Step b3: The steering shaft lock (ECL) sends code matching verification information to the key controller (IK), and the key controller (IK) determines, according to the code matching verification information, whether the code matching succeeds.

Step b4: The key controller (IK) feeds back a verification result to the steering shaft lock (ECL), that is, feeding back an unlocking permission signal to the steering shaft lock (ECL) after the code matching succeeds;

Step b5: The steering shaft lock ECL executes the unlocking permission signal, and the unlocking succeeds.

(3) Start stage:

Step c1: The user enters the vehicle and depresses a brake pedal, and the body control module (BCM) collects brake pedal sensor information, and sends, to the key controller (IK), a request for searching for a key.

Step c2: After detecting that the key is in the vehicle, the key controller (IK) feeds back, to the body control module (BCM), information that the key is in the vehicle, and the body control module (BCM) determines that the key is in the vehicle.

Step c3: The user presses a start button, the body control module (BCM) supplies power to the steering shaft lock (ECL), and sends an unlocking state determining signal to the steering shaft lock (ECL).

Step c4: If the steering shaft lock (ECL) is in an unlocked state, send an unlocked state signal to the body control module (BCM); and if the steering shaft lock (ECL) is in the locked state, code matching verification information is sent to the key controller (IK). The key controller (IK) performs determining according to the code matching verification information and controls the steering shaft lock (ECL) to be unlocked after code matching succeeds, and sends the unlocked state signal to the body control module (BCM) after unlocking.

Step c5: The body control module (BCM) controls IG1, IG2, and ACC relays to pull in to connect high-voltage modules such as a transmission control unit (TCU) and an engine control module (ECM) to the power supply circuit, and the high-voltage modules such as the transmission control unit (TCU) and the engine control module (ECM) perform power-on self-check.

Step c6: The transmission control unit (TCU) sends a gear position signal to the body control module (BCM).

Step c7: The body control module (BCM) determines that the vehicle is in a P gear or an N gear at this time, and the body control module (BCM) sends a start request to the vehicle control unit (VCU).

Step c8: After receiving the start request, the vehicle control unit (VCU) sends first verification information (including a first random number and a first encrypted number) to the key controller (IK) for verification.

Step c9: After performing verification successfully, the key controller (IK) sends the second verification information (including a second random number and a second encrypted number) to the vehicle control unit (VCU) and the motor controller (that is, the electric control in FIG. 2).

Step c10: After performing verification and determination, the vehicle control unit and the motor controller sends information about decoding success to the key controller (IK).

Step c11: If the vehicle is a hybrid electric vehicle (HEV), the vehicle control unit (VCU) sends third verification information (including a third random number and a third encrypted number) to the engine control module, and the motor controller sends fourth verification information (including a fourth random number and a fourth encrypted number) to the engine control module, and after the engine control module (ECM) performs verification and determining, the engine control module sends verification success information to the vehicle control unit (VCU) and the motor controller.

Step c12: After receiving the verification success, the vehicle control unit (VCU) sends start permission information to the body control module (BCM) and the battery management system (BMS).

Step c13: The battery management system (BMS) feeds back discharging permission, and the body control module (BCM) allows the vehicle to enter an OK gear, and the start is over.

Based on the foregoing, in the start control method for a vehicle according to the embodiment of the present disclosure, when the door of the vehicle is in the open state and the key is in the vehicle, the first high-voltage module group of the vehicle is controlled to perform power on, and when the door is changed from the open state to the closed state, and the brake pedal of the vehicle is depressed and the key is in the vehicle, a second high-voltage module group of the vehicle is controlled, according to a start instruction, to perform power on, so that the first high-voltage module group is controlled in advance, by using a time for a user to open and close the door, to perform power on, reducing a time for the user to start the vehicle after inputting a start instruction, effectively shortening a time for the user to wait for the vehicle to start, and improving user experience.

Based on the foregoing embodiment, an embodiment of the present disclosure further provides a start control system of a vehicle.

Figure 3:
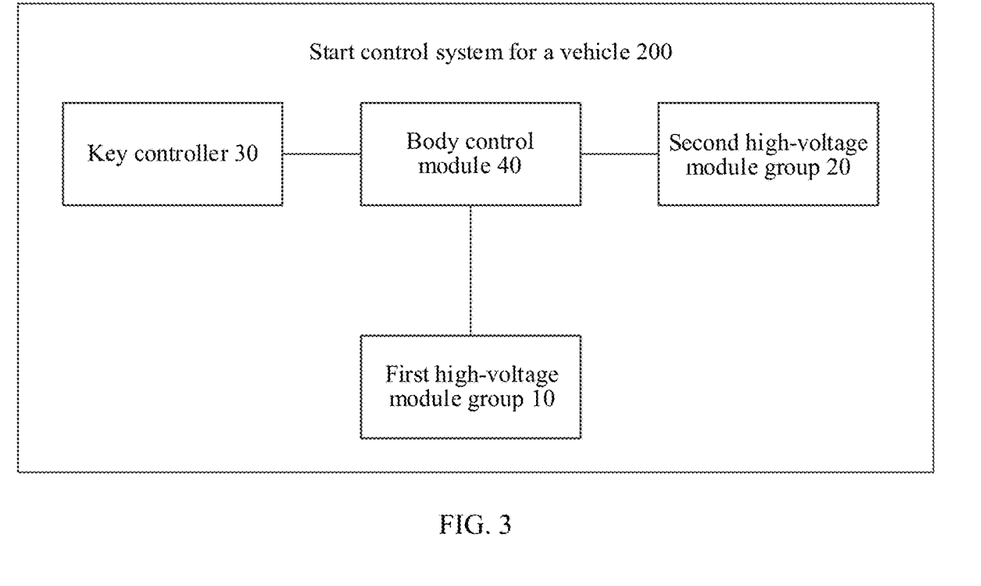
FIG. 3 is a schematic block diagram of a start control system of a vehicle according to an embodiment of the present disclosure.

FIG. 3 is a schematic block diagram of a start control system of a vehicle according to an embodiment of the present disclosure. As shown in FIG. 3, the start control system 200 for the vehicle includes: a first high-voltage module group 10, a second high-voltage module group 20, a key controller 30, and a body control module 40.

The key controller 30 is configured to detect whether a key is in the vehicle. When a door of the vehicle is in an open state, the body control module 40 is configured to determine a position of the key through the key controller 30; when determining that the key is in the vehicle, the body control module is configured to control the first high-voltage module group 10 to perform power on; when the door of the vehicle is changed from the open state to a closed state, the body control module is configured to determine the position of the key through the key controller 30 and detect a state of a brake pedal of the vehicle; and when the brake pedal of the vehicle is depressed and the key is in the vehicle, the body control module is configured to control, according to a start instruction, the second high-voltage module group 20 to perform power on.

According to an embodiment of the present disclosure, the first high-voltage module group 10 may include at least one of a vehicle control unit, a battery management system, and a motor controller.

According to an embodiment of the present disclosure, the first high-voltage module group 10 includes a vehicle control unit, a battery management system, and a motor controller. When the first high-voltage module group 10 of the vehicle is controlled to perform power on, the body control module 40 is configured control the vehicle control unit, the battery management system, and the motor controller to perform power-on self-check, respectively. The vehicle control unit is configured to control, after the power-on self-check is completed, the battery management system to perform pre-charging, and the battery management system pulls in a main contactor upon completion of the pre-charging.

According to an embodiment of the present disclosure, after the door of the vehicle is in the closed state, the body control module 40 is further configured to supply power to a steering shaft lock of the vehicle, and control the steering shaft lock to perform code matching verification with the key controller 30 of the vehicle, and control the steering shaft lock to be unlocked after the code matching verification succeeds.

According to an embodiment of the present disclosure, the body control module 40 is further configured to, after receiving a start instruction, supply power to the steering shaft lock of the vehicle and determine a state of the steering shaft lock, and if the steering shaft lock is in a locked state, control the steering shaft lock to perform code matching verification with the key controller 30 of the vehicle, and after the code matching verification succeeds, control the steering shaft lock to be unlocked, and after the steering shaft lock is unlocked, control the second high-voltage module group 20 of the vehicle to perform power on.

According to an embodiment of the present disclosure, the second high-voltage module group 20 includes a transmission control unit and an engine control module. When the second high-voltage module group 20 is controlled to perform power on, the body control module 40 is configured to control the transmission control unit and the engine control module to perform power-on self-check.

According to an embodiment of the present disclosure, after the second high-voltage module group 20 is controlled to perform power on, the body control module 40 is further configured to determine a gear position of the vehicle, and control, when the vehicle is in a P gear or an N gear, the vehicle to enter a start permission state.

According to an embodiment of the present disclosure, the body control module 40 is configured to control the vehicle control unit to send first verification information to the key controller 30. The key controller 30 performs verification according to the first verification information, and sends second verification information to the vehicle control unit and the motor controller after the verification succeeds, and the vehicle control unit and the motor controller perform verification according to the second verification information. The body control module 40 is further configured to control, after both the vehicle control unit and the motor controller perform verification successfully, the vehicle to enter the start permission state.

According to an embodiment of the present disclosure, the body control module 40 is configured to control the vehicle control unit to send the first verification information to the key controller 30. The key controller 30 performs verification according to the first verification information, and sends the second verification information to the vehicle control unit and the motor controller after the verification succeeds, the vehicle control unit and the motor controller perform verification according to the second verification information, and after both the vehicle control unit and the motor controller perform verification successfully, the vehicle control unit sends third verification information to the engine control module, the motor controller sends fourth verification information to the engine control module, and the engine control module performs verification according to the third verification information and the fourth verification information, respectively. The body control module 40 is configured to control, after the engine control module performs verification successfully according to both the third verification information and the fourth verification information, the vehicle to enter the start permission state.

It should be noted that the foregoing explanation of the embodiment of the start control method for a vehicle is also applicable to the start control system of the vehicle this embodiment, and is not described in detail herein any more.

Based on the foregoing, in the start control system of a vehicle according to the embodiment of the present disclosure, when the door of the vehicle is in the open state and the key is in the vehicle, the body control module controls the first high-voltage module group of the vehicle to perform power on, and when the door is changed from the open state to the closed state, and the brake pedal of the vehicle is depressed and the key is in the vehicle, the body control module controls, according to a start instruction, a second high-voltage module group of the vehicle to perform power on, so that the first high-voltage module group is controlled in advance, by using the time for the user to open and close the door, to perform power on, reducing a time for the user to start the vehicle after inputting a start instruction, effectively shortening a time for the user to wait for the vehicle to start, and improving user experience.

In order to implement the foregoing embodiment, the present disclosure further provides a vehicle.

Figure 4:
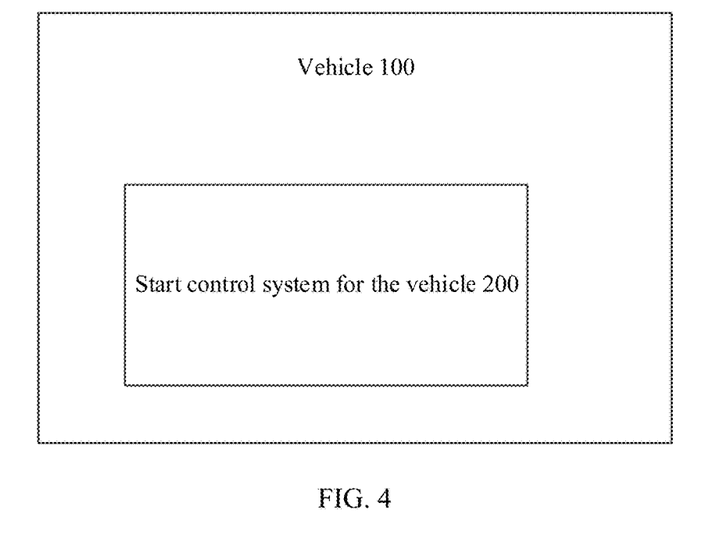
FIG. 4 is a schematic block diagram of a vehicle according to an embodiment of the present disclosure.

FIG. 4 is a schematic block diagram of a vehicle according to an embodiment of the present disclosure. As shown in FIG. 4, a vehicle 100 includes a start control system 200 of the vehicle of the foregoing embodiment.

For the vehicle according to the embodiment of the present disclosure, by using the start control system of the foregoing embodiment, the first high-voltage module group is controlled in advance, by making full use of a time for the user to open and close the door, to perform power on, reducing the time for the user to start the vehicle after inputting a start instruction, effectively shortening a time for the user to wait for the vehicle to start, and improving user experience.

In description of the specification, description of reference terms such as "one embodiment", "some embodiments", "example", "specific example" or "some examples"

means including specific features, structures, materials, or features described in the embodiment or example in at least one embodiment or example of the present disclosure. In this specification, schematic descriptions of the foregoing terms do not necessarily directed at a same embodiment or example. In addition, the described specific features, structures, materials, or features can be combined in a proper manner in any one or more embodiments or examples. In addition, in a case that is not mutually contradictory, a person skilled in the art can combine or group different embodiments or examples that are described in this specification and features of the different embodiments or examples.

In addition, terms "first" and "second" are only used to describe the objective and cannot be understood as indicating or implying relative importance or implying a quantity of the indicated technical features. Therefore, features defining "first" and "second" can explicitly or implicitly include at least one of the features. In description of the present disclosure, "multiple" means at least two, such as two and three unless it is specifically defined otherwise.

Any process or method description described in a flowchart or in another manner can be understood as a module, segment, or part representing codes including one or more executable instructions for implementing specific logical functions or steps of a process. In addition, a range of preferred implementations of the present disclosure include another implementation, and functions can be executed not according to the shown or discussed sequence, including according to a basically simultaneous manner according to involved functions or an opposite sequence, which should be understood by a person skilled in the art of the embodiments of the present disclosure.

The logic and/or steps shown in the flowcharts or described in any other manner herein, for example, a sequenced list that may be considered as executable instructions used for implementing logical functions, may be specifically implemented in any computer readable medium to be used by an instruction execution system, apparatus, or device (for example, a computer-based system, a system including a processor, or another system that can obtain an instruction from the instruction execution system, apparatus, or device and execute the instruction) or to be used by combining such instruction execution systems, apparatuses, or devices. In the context of this specification, a "computer-readable medium" may be any apparatus that can include, store, communicate, propagate, or transmit the program for use by the instruction execution system, apparatus, or device or in combination with the instruction execution system, apparatus, or device. More specific examples (a nonexhaustive list) of the computer-readable medium include the following: an electrical connection (electronic apparatus) having one or more wires, a portable computer diskette (magnetic apparatus), a random access memory (RAM), a read-only memory (ROM), an erasable programmable read-only memory (EPROM or flash memory), an optical fiber apparatus, and a portable compact disk read-only memory (CDROM). In addition, the computer readable medium may even be a piece of paper for printing the program, or another proper medium, because, for example, optical scanning may be performed on the paper or another medium, and then processing is performed by performing editing and decryption, or in another proper manner to obtain the program in an electronic manner. Then the program is stored in a computer memory.

It should be understood that parts of the present disclosure may be implemented by using hardware, software, firmware, or combinations thereof. In the foregoing implementations, a plurality of steps or methods may be implemented by using software or firmware that are stored in a memory and are executed by a proper instruction execution system. For example, if hardware is used for implementation, same as in another implementation, implementation may be performed by any one of the following technologies well known in the art or a combination thereof: a discrete logic circuit of a logic gate circuit for realizing a logic function for a data signal, an application-specific integrated circuit having a suitable combined logic gate circuit, a programmable gate array (PGA), and a field programmable gate array (FPGA).

A person of ordinary skill in the art may understand that all or some of the steps of the method embodiments may be implemented by a program instructing relevant hardware. The program may be stored in a computer-readable storage medium. When the program is run, one or a combination of the steps of the method embodiments are performed.

In addition, functional units in the embodiments of the present disclosure may be integrated into one processing module, or each of the units may exist alone physically, or two or more units are integrated into one module. The integrated module may be implemented in a hardware form, or may be implemented in a form of a software functional module. The integrated module may be implemented in a hardware form, or may be implemented in a form of a software functional module.

The aforementioned storage medium may be a read-only memory, a magnetic disk, or an optical disc. Although the embodiments of the present disclosure are shown and described above, it can be understood that, the foregoing embodiments are exemplary, and cannot be construed as a limitation to the present disclosure. Within the scope of the present invention, a person of ordinary skill in the art may make changes, modifications, replacement, and variations to the foregoing embodiments.

What is claimed is:

1. A start control method for a start control system of a vehicle, comprising:
   when detecting that a door of the vehicle is in an open state, determining a position of a key;
   when detecting that the key is in the vehicle after determining that the door of the vehicle is in the open state, controlling a first high-voltage module group of the vehicle to perform power on, wherein the first high-voltage module group includes high-voltage modules of the vehicle requiring a significant pre-charging time to prepare for start;
   when detecting that the door of the vehicle is changed from the open state to a closed state, determining the position of the key and detecting a state of a brake pedal of the vehicle; and
   when detecting that the brake pedal of the vehicle is depressed and the key is in the vehicle, controlling, according to a start instruction to start the vehicle, a second high-voltage module group of the vehicle to perform power on while the first high-voltage module group is pre-charged for start, such that a time duration to power on the vehicle is reduced.

2. The start control method for a vehicle according to claim 1, wherein the first high-voltage module group comprises at least one of a vehicle control unit, a battery management system, and a motor controller.

3. The start control method for a vehicle according to claim 1, wherein the first high-voltage module group comprises the vehicle control unit, the battery management system, and the motor controller, wherein the controlling a first high-voltage module group of the vehicle to perform power on comprises:

controlling the vehicle control unit, the battery management system, and the motor controller to respectively perform power-on self-check; and after the power-on self-check is completed, controlling, by the vehicle control unit, the battery management system to perform pre-charging, and the battery management system pulling in a main contactor upon completion of the pre-charging.

4. The start control method for a vehicle according to according to claim 1, wherein the second high-voltage module group comprises a transmission control unit and an engine control module, and the controlling a second high-voltage module group to perform power on comprises: controlling the transmission control unit and the engine control module to perform power-on self-check.

5. The start control method for a vehicle according to claim 1, after the controlling the second high-voltage module group to perform power on, further comprising:

determining a gear position of the vehicle; and controlling, when the vehicle is in a P gear or an N gear, the vehicle to enter a start permission state.

6. The start control method for a vehicle according to claim 5, wherein the controlling the vehicle to enter a start permission state comprises:

sending, by the vehicle control unit, first verification information to the key controller;

performing, by the key controller, verification according to the first verification information, and sending second verification information to the vehicle control unit and the motor controller after the verification succeeds;

performing, by the vehicle control unit and the motor controller, verification according to the second verification information; and after both the vehicle control unit and the motor controller perform verification successfully, controlling the vehicle to enter the start permission state.

7. The start control method for a vehicle according to claim 5, wherein the controlling the vehicle to enter a start permission state comprises:

sending, by the vehicle control unit, first verification information to the key controller;

performing, by the key controller, verification according to the first verification information, and sending second verification information to the vehicle control unit and the motor controller after the verification succeeds;

performing, by the vehicle control unit and the motor controller, verification according to the second verification information; and after both the vehicle control unit and the motor controller perform verification successfully, sending, by the vehicle control unit, third verification information to the engine control module, and sending, by the motor controller, fourth verification information to the engine control module; and performing, by the motor controller, verification according to the third verification information and the fourth verification information, respectively, and controlling the vehicle to enter a start permission state after the verification succeeds.

8. A start control system of a vehicle, comprising:

a first high-voltage module group and a second high-voltage module group;

a key controller configured to detect whether a key is in the vehicle; and a body control module configured to: when a door of the vehicle is in an open state, determine a position of the key through the key controller; when determining that the key is in the vehicle after determining that the door of the vehicle is in the open state, control the first high-voltage module group to perform power on, wherein the first high-voltage module group includes high-voltage modules of the vehicle requiring a significant pre-charging time to prepare for start; when the door of the vehicle is changed from the open state to a closed state, determine the position of the key through the key controller and detect a state of a brake pedal of the vehicle; and when the brake pedal of the vehicle is depressed and the key is in the vehicle, control, according to a start instruction to start the vehicle, the second high-voltage module group to perform power on while the first high-voltage module group is pre-charged for start, such that a time duration to power on the vehicle is reduced.

9. The start control system of a vehicle according to claim 8, wherein the first high-voltage module group comprises at least one of a vehicle control unit, a battery management system, and a motor controller.

10. The start control system of a vehicle according to claim 8, wherein the first high-voltage module group comprises the vehicle control unit, the battery management system, and the motor controller, wherein when the first high-voltage module group of the vehicle is controlled to perform power on, the body control module is configured to control the vehicle control unit, the battery management system, and the motor controller to perform power-on self-check, respectively; and the vehicle control unit is configured to control, after the power-on self-check is completed, the battery management system to perform pre-charging, and the battery management system pulls in a main contactor upon completion of the pre-charging.

11. The start control system of a vehicle according to claim 8, wherein the second high-voltage module group comprises a transmission control unit and an engine control module, when the second high-voltage module group is controlled to perform power on, the body control module being configured to control the transmission control unit and the engine control module to perform power-on self-check.

12. The start control system of a vehicle according to claim 8, wherein after the second high-voltage module group is controlled to perform power on, the body control module is further configured to determine a gear position of the vehicle, and control, when the vehicle is in a P gear or an N gear, the vehicle to enter a start permission state.

13. The start control system of a vehicle according to claim 12, wherein the body control module is configured to control the vehicle control unit to send first verification information to the key controller, wherein the key controller performs verification according to the first verification information, and sends second verification information to the vehicle control unit and the motor controller after the verification succeeds, and the vehicle control unit and the motor controller perform verification according to the second verification information; and the body control module is further configured to control, after both the vehicle control unit and the motor controller perform verification successfully, the vehicle to enter the start permission state.

14. The start control system of a vehicle according to claim 12, wherein the body control module is configured to control the vehicle control unit to send the first verification information to the key controller, wherein the key controller performs verification according to the first verification information, and sends the second verification information to the vehicle control unit and the motor controller after the verification succeeds, the vehicle control unit and the motor controller perform verification according to the second verification information, and after both the vehicle control unit and the motor controller perform verification successfully, the vehicle control unit sends third verification information to the engine control module, the motor controller sends fourth verification information to the engine control module, and the motor controller performs verification according to the third verification information and the fourth verification information, respectively; and the body control module is configured to control, after the motor controller performs verification successfully according to both the third verification information and the fourth verification information, the vehicle to enter the start permission state.

15. A vehicle, comprising:

a start control system configured to perform:

when detecting that a door of the vehicle is in an open state, determining a position of a key;

when detecting that the key is in the vehicle after determining that the door of the vehicle is in the open state, controlling a first high-voltage module group of the vehicle to perform power on, wherein the first high-voltage module group includes high-voltage modules of the vehicle requiring a significant pre-charging time to prepare for start;

when detecting that the door of the vehicle is changed from the open state to a closed state, determining the position of the key and detecting a state of a brake pedal of the vehicle; and when detecting that the brake pedal of the vehicle is depressed and the key is in the vehicle, controlling, according to a start instruction to start the vehicle, a second high-voltage module group of the vehicle to perform power on while the first high-voltage module group is pre-charged for start, such that a time duration to power on the vehicle is reduced.

16. The vehicle according to claim 15, wherein the first high-voltage module group comprises at least one of a vehicle control unit, a battery management system, and a motor controller.

17. The vehicle according to claim 15, wherein the first high-voltage module group comprises the vehicle control unit, the battery management system, and the motor controller, wherein the controlling a first high-voltage module group of the vehicle to perform power on comprises:

controlling the vehicle control unit, the battery management system, and the motor controller to respectively perform power-on self-check; and after the power-on self-check is completed, controlling, by the vehicle control unit, the battery management system to perform pre-charging, and the battery management system pulling in a main contactor upon completion of the pre-charging.

18. The vehicle according to according to claim 15, wherein the second high-voltage module group comprises a transmission control unit and an engine control module, and the controlling a second high-voltage module group to perform power on comprises: controlling the transmission control unit and the engine control module to perform power-on self-check.

19. The vehicle according to claim 15, wherein, after the controlling the second high-voltage module group to perform power on, the start control system is further configured to perform:

determining a gear position of the vehicle; and controlling, when the vehicle is in a P gear or an N gear, the vehicle to enter a start permission state.

\* \* \* \* \*